United States Patent [19]

Pinson

[11] Patent Number: 4,926,107
[45] Date of Patent: * May 15, 1990

[54] VARIABLE INERTIA ENERGY STORAGE SYSTEM

[75] Inventor: George T. Pinson, Huntsville, Ala.

[73] Assignee: The Boeing Company, Seattle, Wash.

[ * ] Notice: The portion of the term of this patent subsequent to Mar. 8, 2005 has been disclaimed.

[21] Appl. No.: 59,807

[22] Filed: Jun. 9, 1987

Related U.S. Application Data

[63] Continuation-in-part of Ser. No. 890,928, Jul. 31, 1986, Pat. No. 4,730,154.

[51] Int. Cl.$^5$ .......................... G05G 1/00; H02K 7/02; H02P 9/04
[52] U.S. Cl. .......................................... 322/4; 74/572; 310/74
[58] Field of Search ................ 322/4; 74/572; 310/74; 290/54

[56] References Cited

U.S. PATENT DOCUMENTS

| | | | |
|---|---|---|---|
| 3,248,967 | 5/1966 | Lewis | 74/572 |
| 4,509,006 | 4/1985 | Pinson | 322/4 |
| 4,725,766 | 2/1988 | Pinson | 322/4 |
| 4,730,154 | 3/1988 | Pinson | 322/4 |

FOREIGN PATENT DOCUMENTS

| | | | |
|---|---|---|---|
| 0184745 | 9/1985 | Japan | 74/572 |
| 0201138 | 10/1985 | Japan | 74/572 |

Primary Examiner—R. J. Hickey
Attorney, Agent, or Firm—Finnegan, Henderson, Farabow, Garrett & Dunner

[57] ABSTRACT

A variable inertia energy storage system for storing large amounts of mechanical energy for an extended period of time on land or on a mobile vehicle includes a fly wheel having a rotating hub with spoke appendages each having an associated mass the center of which can be controllably changed with respect to the hub axis of rotation. The energy storage system also includes motor/generator elements for providing rotation forces to input mechanical energy to the flywheel or for generating electrical power for use on demand by a subsystem or the like.

17 Claims, 4 Drawing Sheets

VARIABLE INERTIA ENERGY STORAGE SYSTEM

This is a continuation-in-part of Ser. No. 890,928 filed July 31, 1986, now U.S. Pat. No. 4,730,154.

BACKGROUND OF THE INVENTION

This invention relates to an energy storage system and more particularly, but not by way of limitation, to a variable inertia energy storage system for storing large amounts of mechanical energy for an extended period of time on land or on a mobile vehicle.

Heretofore there have been a large number of different methods used and systems proposed for storing electrical power. These systems include the classical methods associated with nuclear power generating stations along with fuel cells, solar cells, inductors, capacitors and batteries.

Also there have been various types of methods used to store power including the use of high speed flywheels. Flywheels have long been used for storing mechanical power. These devices are designed to withstand forces associated with rotational rates of several thousand of revolutions per minute. The forces associated with these high speeds are destructive in nature and relatively minor structural defects can cause catastrophic failures.

In U.S. Pat. Nos. 4,509,006 and 4,546,264 the subject inventor discloses alternate energy storage systems for storing both mechanical and electrical energy in different types of land and space environments. The subject invention is a substantial improvement over, and an extension of, the state of the art energy storage systems.

SUMMARY OF THE INVENTION

The subject variable inertia energy storage system provides a means to store mechanical energy at reduced rpms. Further, the system is adaptable for land use or on mobile vehicles such as a truck, a train, a boat and other types of mobile equipment.

The storage system includes an enclosed circular housing disposed on a mounted base. A vacuum system may be applied to the enclosed housing for reducing pressure on the equipment therein. A rotatable central hub is mounted inside the housing and includes a plurality of equally spaced spokes extending outwardly therefrom. A mass is mounted on each of the spokes. A reversible drive motor for controllably moving the mass a desired distance from the axis of rotation of the hub is provided. Rotor-mounted motor/generator elements such as magnet coils or field coils cooperate with complementary motor/generator elements which can be positioned on the adjacent housing periphery. Relative motion between the motor/generator elements and the complementary elements provides for generating electricity or providing motive force at the command of an electrical controller. The controller includes an individual power controller, speed controller and vacuum pump controller for regulating the enclosed storage system.

The advantages and objects of the invention will become evident from the following detailed description of the drawings when read in connection with the accompanying drawings which illustrate preferred embodiments of the invention.

Figure 12:
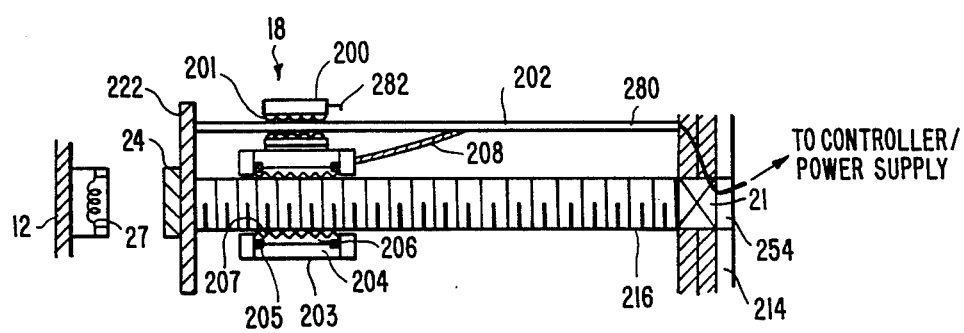

And, FIG. 12 illustrates an embodiment wherein the positioning drive motors serve as the inertial masses.

DETAILED DESCRIPTION OF THE PREFERRED EMBODIMENTS

Figure 1A:
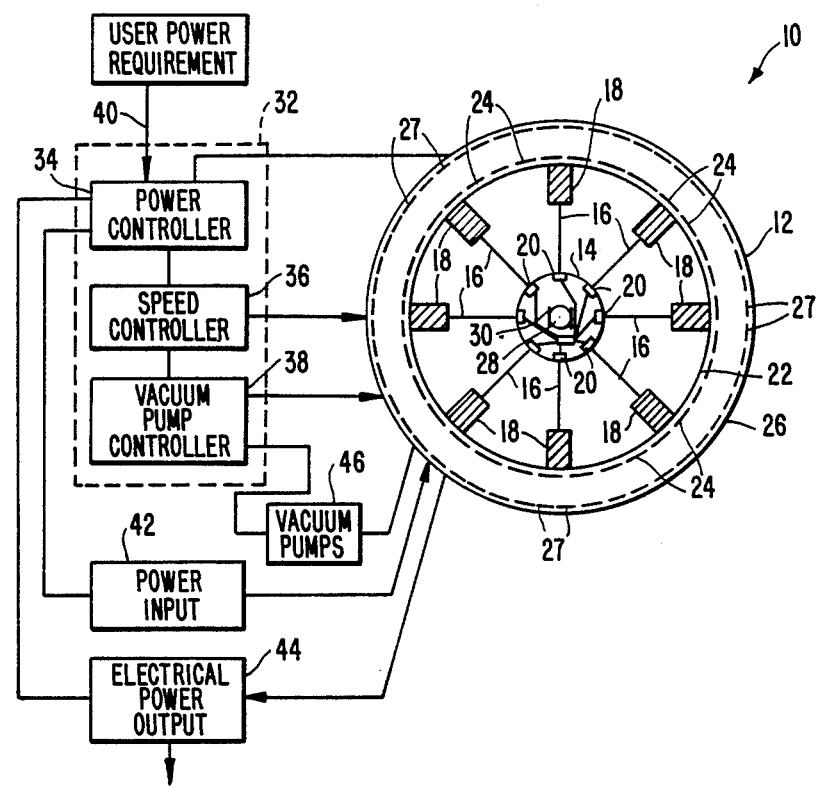
FIGS. 1A and 1B illustrate a top and side view of a storage system made in accordance with the present inventions.
Figure 1B:
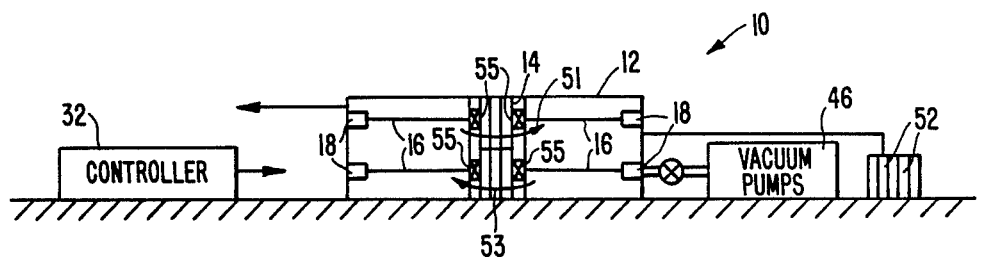

In FIGS. 1A and 1B the variable inertia energy storage system is designated by general reference numeral 10. The system 10 includes an enclosed housing 12 having a central hub 14 centered therein The hub 14 includes a plurality of spokes 16 each extending outwardly therefrom and each having a movable mass 18 mounted thereon. The central hub 14 includes reversible drive motors 20 for moving the masses 18 along the length of the spokes 16.

With continued reference to FIGS. 1A and 1B, disposed around the outer ends of the spokes 18 is a structural ring or hoop 22 having a plurality of rotor-mounted motor/generator elements 24, such as permanent magnets, magnet coils or field coils, mounted therearound. Also disposed in a spaced relationship around an outer periphery 26 of the housing 12 are complementary motor/generator elements 27. Thus, if the motor/generator elements positioned on rotating hoop 22 are magnets or magnet coils, the complementary motor/generator elements on stationary housing periphery 26 would be field coils, or vice versa.

Attached to the central hub 14 are slip rings 28 or an optical equivalent for control of the hub's drive mechanism. Also included are an optional slip ring power interface 30.

The storage system 10 is controlled by a central controller 32 shown in dotted lines and having a power controller 34, a speed controller 36 and a vacuum pump controller 38. The power controller 34 receives a user power requirement indicated by arrow 40 and controls power input 42 and electrical power output 44. The vacuum pump controller 38 is connected to vacuum pumps 46. The pumps 46 are used for drawing a vacuum or reducing pressure in the housing 12.

Figure 4:
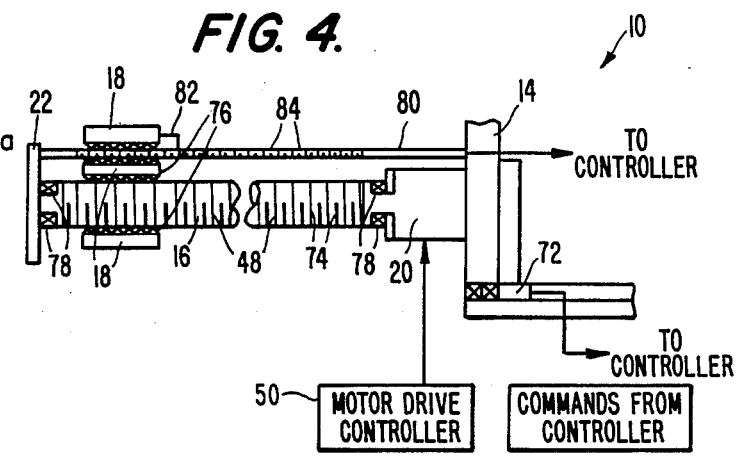
FIG. 4 illustrates an enlarged side view of an outwardly extending spoke formed as a lead screw with a movable mass and a position scale.

In operation, the power controller 34 positions the movable masses 18 proximate hub 14 for initiations in a motor configuration by energizing complementary electrical elements 27 which can be field coils on the housing 12. By sequencing the field polarity of coils 27 the speed of the elements 24, which can be permanent magnets, is increased, along with hoop 22, spokes 16, and attached movable masses 18. To reduce the electrical power initially required the movable masses 18 are moved inwardly using lead screws 48 shown in FIG. 4. The lead screws 48 are part of the spokes 16. When the masses 18 are moved inwardly the radial positions of the masses provide a minimum moment of inertia. As the speed of the masses 18 is increased the masses 18 are moved by the reversible drive motors 20 to the outside extremity adjacent the hoop 22 at a rate commanded through a motor drive controller 50 connected to the speed controller 36.

To reduce aerodynamic loss and pressure inside the housing 12 vacuum pumps 46 are used and commanded by the vacuum pump controller 38. As an alternative as shown in FIG. 1B, in combination with the vacuum system a low molecular weight gas, such as helium in helium bottles 52, can be introduced into the housing 12 through commands from the controller 32.

In FIG. 1B the system is shown with a plurality of counter rotating spokes 16 and masses 18 indicated by arrows 51 and 53. The hub 14 also includes support bearings 55.

Figure 2A:
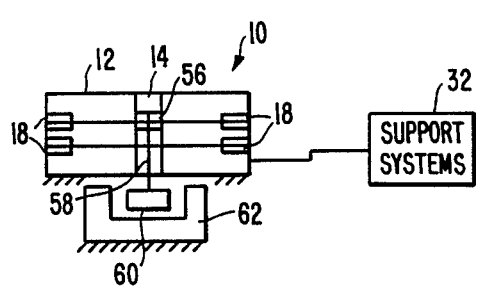
FIGS. 2A and 2B illustrate two alternate motor/generator combinations used with the storage system.
Figure 2B:
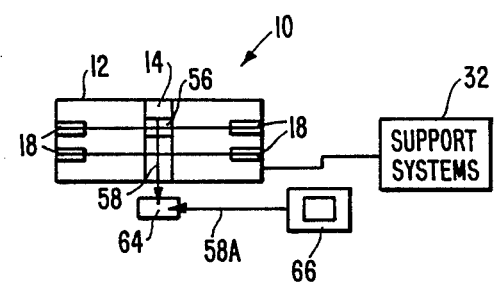

In FIGS. 2A and 2B, two alternate motor/generator combinations used with the storage systems are shown. In FIG. 2A, direct shaft drive shaft 58 connects flywheel hub 14 to motor/generator armature 60 which rotates in disposed relation with motor/generator field windings 62. In FIG. 2B, shaft 58 connects with transmission 64 which further connects with a remote motor/generator system 66 such as through shaft 58A.

Figure 3:
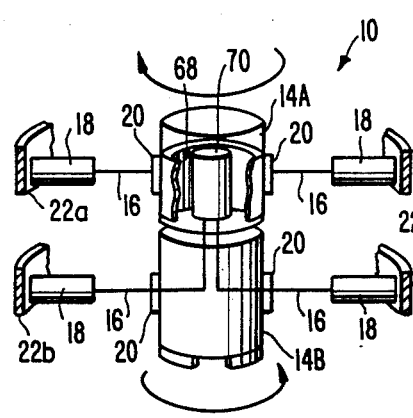
FIG. 3 illustrates the use of a central hub in the housing for mounting a motor/generator.

FIG. 3 illustrates the use of a two-part central hub 14A, 14B in the housing for mounting a motor/generator. Positioned within hub part 14A are field windings 68 and armature windings 70. In FIG. 3, one movable hub part 14A controls rotation of field windings 68 and the second hub part 14B, which can rotate in the opposite direction from hub part 14A, controls the armature windings 70.

Figure 5:
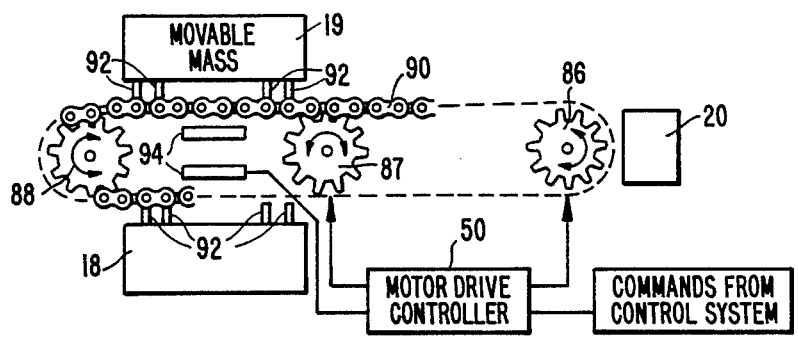
FIG. 5 illustrates an alternate drive system for positioning the movable mass.

An alternate drive system for positioning the movable mass 18 is shown in FIG. 5. The alternate system includes opposing, spaced chain pulleys 86, 88, continuous chain 90 with weight attachments 92, and position feedback sensors 94.

Figure 6:
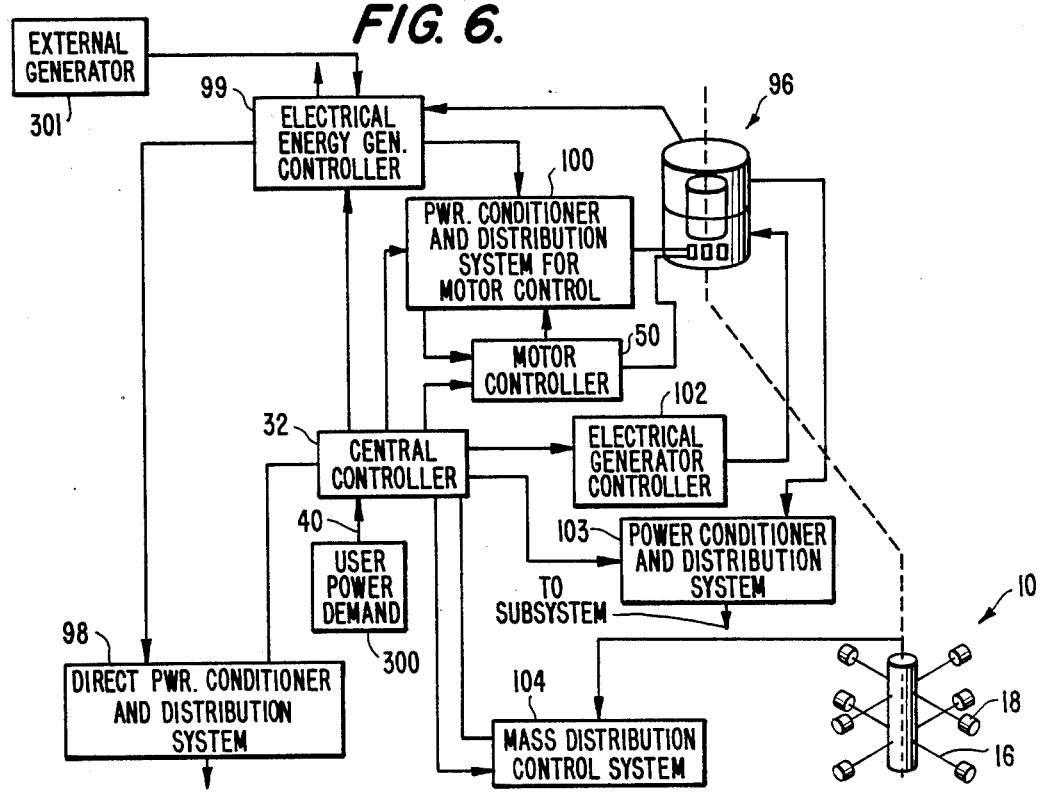
FIG. 6 illustrates the details of the power user and controller subsystem.

Referring now to FIG. 6 the user 300 places power demands 40 upon the central controller 32. The controller 32 operates under several of three primary modes. As an electric power source, electrical power is supplied by the electrical energy generator component 96 of system 10 under control of generator controller 99 to a direct power conditioning and distribution system 98. Here the power is stepped up or down as desired to the required potential and distributed for use by the various subsystems.

The system may also operate in an energy storage system mode. In this mode, commands are sent to controller 99, the power conditioner and distribution system for the motor control 100, and the motor controller 50. The electrical power/generator component 96 is conditioned by controller 50 as a motor and the motor counterrotates the spokes 16 in system 10 using energy supplied from an outside generator 301 through the electrical energy controller 99.

A user mode can also be activated. This is accomplished by demands to the electrical generator controller 102 made by the central controller 32. The electrical motor/generator component 96 of system 10 is electrically switched to a generator mode and the rotating inertial units (weights 18 on spokes 16) drive the field coils and armature in opposite directions. The generated electrical energy is routed to the defined subsystems by the power distribution and conditioning system 103. The mass distribution control system 104 interfaces with motor drive controller 50 through central controller 32 to maintain a constant RPM.

Figure 7A:
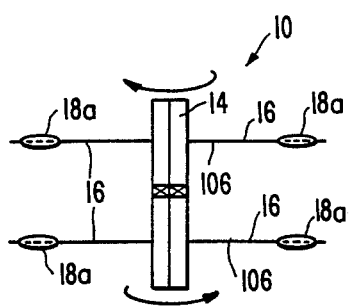
FIGS. 7A and 7B illustrate the use of wheel covers on the rotating spokes for reducing drag.
Figure 7B:
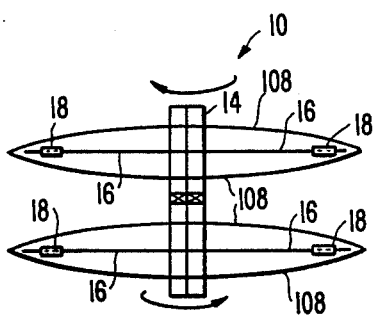

FIGS. 7A and 7B illustrate the use of wheel covers on the rotating spokes for reducing drag when it is not desired to use a low friction atmosphere (e.g. vaccuum or low molecular weight gas). In FIG. 7A, wheel cover 106 has a flat cross-sectional profile with aerodynamically shaped movable weights 18a. In FIG. 7B, non-aerodynamically shaped weights 18 are enclosed, with the spokes, by an aerodynamically shaped cover 108.

The objective of the wheel cover 106 or 108 is to reduce aerodynamic drag as the spokes rotate about the central hub. The preferred embodiments shown in FIG. 7A uses flat aerodynamic wheel covers that fill the gaps between the spokes. The use of aerodynamically shaped movable masses 18a will further reduce drag. The alternate design of FIG. 7B provides an aerodynamically smooth cover with all of the movable element inside the cover 108. Variations to provide lateral structural strength to the wheels can be included in the alternate design, as would be apparent to one skilled in the art given this disclosure.

Figure 8:
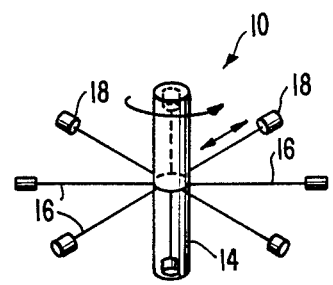
FIG. 8 illustrates a baseline concept of the movable masses.
Figure 9A:
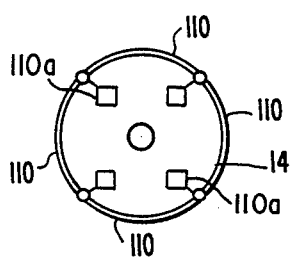
FIGS. 9A, 9B and 9C illustrate an extendable or "ballerina" movable mass concept.
Figure 9B:
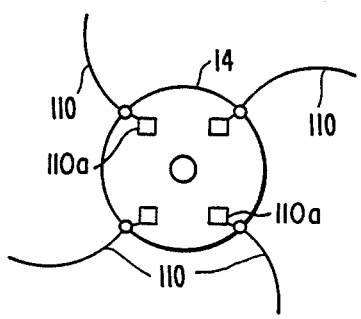
Figure 9C:
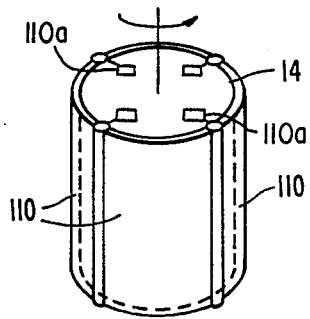

FIG. 8 illustrates the baseline concept of the movable masses 18 on radially fixed with respect to hub 14 but axially rotatable spokes 16. In comparison, FIGS. 9A, 9B and 9C illustrate an extendable or "ballerina" movable mass alternative concept where the weights 110 are in the form of thin-walled cylindrical sections activated by respective drive motors 110A which can swing tangentially outward to a controlled degree (FIG. 9B) from the closed (FIG. 9A, 9C) position. As is evident from FIGS. 9A–9C, the thin-walled cylindrical sections are elongated members each having a distributed mass, rather than a point mass. However, as one skilled in the art would appreciate, each cylindrical section has an effective center of mass. The changing center of mass radial location for the swinging weights 110 provide a controllable changing moment of inertia similar to sliding weights 18 in the FIG. 8 base-line concept.

Figure 10A:
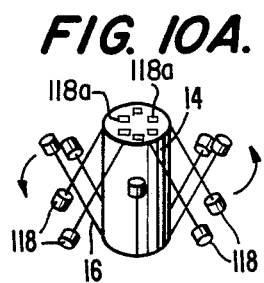
FIGS. 10A, 10B, 10C and 10D illustrate perspective views and a top view of an "umbrella" mass motion concept.
Figure 10B:
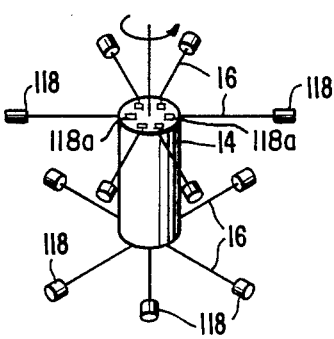
Figure 10C:
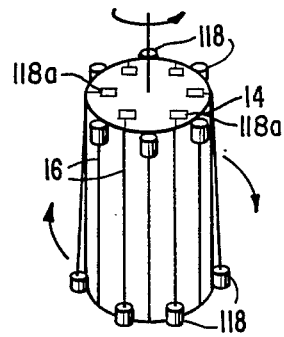
Figure 10D:
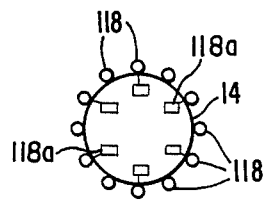

FIGS. 10A, 10B and 10C illustrate perspective views, and FIG. 10D a top view, of an "umbrella" mass motion concept. In this variation, masses 118 are fixed with respect to spokes 16 and spokes 16 activated by respective drive motors 118a swing radially outward from hub 14 to a controlled degree, in order to provide the controllable changing movement of inertia to system 10. When closed, the spokes plus attached weights rest and nest against hub 14 in the manner of two opposed umbrella frames.

Figure 11A:
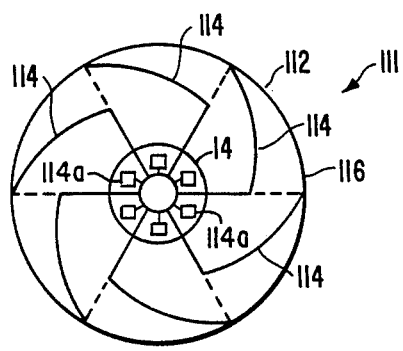
FIGS. 11A and 11B illustrate an "iris" apparatus for inertia control.
Figure 11B:
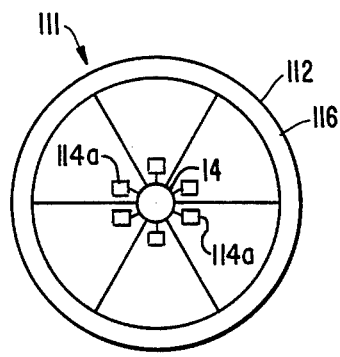

FIG. 11A illustrates a movable mass variation based on an "iris" action. In this design a near standard iris mechanism is used where the iris blades 114 activated by respective drive motors 114a constitute the movable mass. As in the case of the FIG. 9A–9C embodiment, each of the iris blades 114 in the FIG. 11A and 11B embodiment is an elongated member with a distributed mass, rather than a point mass. In the maximum movement of inertia configuration depicted in FIG. 11B the iris is wide open with the center of mass close to the fixed outer ring 112. As energy is extracted from the system the iris is closed progressively to a minimum moment of inertia structure, thereby moving the center of mass closer to the axis of rotation of hub 14.

In a significant variation on the above described system, and further in accordance with the present invention, the reversible drive motors themselves can serve as movable masses 18. As embodied herein, and as best seen in FIG. 12, a lead screw spoke 216 is attached to the central hub 214 through a bearing 21. A position slide 280 made up typically of a smooth rod 202 with a position indicator rod 282 or other position indicator is provided for control system feedback so that current knowledge of the motor is available at all times.

The follower 200 is provided to prevent the entire reversible drive motor 203 from rotating. A bearing 201 is provided on the follower to reduce friction, and position readout 282 is provided to cooperate with slide 280.

Lead screw spike 216 is threaded. Reversible drive motor 203 is designed with a hollow armature 206 which is threaded on the inside 207 to match the lead screw spoke. The hollow armature is attached to the field 204 using standard means including bearings 205. Power and control information is provided to the motor 203 through cabling 208.

The lead screw 216 and rod 202 are attached to hoop 222 at the end of the fixed rod. Motor/generator elements 24, which in this case are shown as permanent magnets, are attached to hoop 222 such that a fixed distance is maintained relative to complementary motor/generator elements 27, field coils in this embodiment, which are attached to housing 12. RPM sensor 254 provides data to the controller/power supply (not shown in the FIG.).

Changes can be made in the construction and arrangement of the parts or elements of the embodiments as described herein without departing from the spirit or scope of the invention defined in the following claims.

I claim:

1. A variable inertia energy storage system for mounting on land or on a vehicle, the storage system comprising:
   an enclosed housing having a periphery;
   a central hub mounted in the center of the housing and rotatably mounted therein;
   a plurality of spokes attached to said central hub and extending outwardly toward the periphery of the housing;
   a plurality of masses each movable mounted on a respective one of the spokes for moving inwardly and outwardly from said central hub, each of said movable masses being self-propelled;
   a hoop disposed around and adjacent said periphery of the housing and adjacent the ends of the spokes, the hoop having electrical motor/generator elements mounted thereon; and
   complimentary motor/generator elements mounted on said housing periphery adjacent said hoop for generating electricity or providing rotation force as said motor/generator elements rotate past said complementary elements.

2. The system as described in claim 1 wherein said movable masses are reversible motor drives, said spokes have threads thereon, and said motor drives are threadingly attached to said spokes for movement inwardly and outwardly along the length of said spokes.

3. A variable inertia energy storage system for mounting on land or on a vehicle, the storage system comprising:
   a rotatable hub;
   a plurality of spokes equally spaced circumferentially around, and hinged attached to, said hub and extendable outwardly therefrom;
   a plurality of masses each fixedly mounted on and movable along with a respective one of said spokes;
   drive motors attached to the central hub and one end of the spokes for extending said spokes and said masses outwardly from said hub; and
   motor/generator means connected to said hub for rotation therewith, for generating electricity or providing a rotation force.

4. The system as described in claim 3 wherein said spokes are extendable radially from said hub.

5. The system as described in claim 4 wherein said plurality of spokes are arranged in two opposed sets, each set being attached to said hub at a different axial location, the spokes in one of said sets extending axially between the spokes in the other of said sets when said spokes are not extended.

6. A variable inertia energy storage system for mounting on land or on a vehicle, the storage system comprising:
   a rotatable hub;
   a plurality of spokes equally spaced circumferentially around, and attached to, said hub and extending outwardly therefrom;
   a plurality of solid masses each engaging a respective one of said spokes, and each being inwardly and outwardly movable from said hub;
   means associated with said spokes for controllably positioning each of said movable masses with respect to the axis of rotation of said hub; and
   motor/generator means operatively connected to said hub for generating electricity or providing rotation force.

7. The system as in claim 6 wherein said masses slidably engage the respective spokes; said hub includes two rotatably independent hub members; said plurality of spokes and associated masses are divided between, and attached to, said two hub members; and said motor/generator means includes field coil elements and magnet elements, said field coil elements being connected to rotate with one of said hub members and said magnet elements being connected to rotate with the other of said hub members.

8. The system as in claim 7 wherein said two hub members counter-rotate with respect to each other.

9. The system as in claim 6 wherein hoop means connect the ends of said spokes distant said hub.

10. The system as in claim 6 wherein said masses are fixedly attached to said spokes and said spokes are hingedly connected to said hub.

11. The system as in claim 10 wherein said spokes and attached masses swing radially with respect to said hub.

12. A variable inertia energy storage system for mounting on land or on a vehicle, the storage system comprising:
   a rotatable hub;
   a plurality of elongated members equally spaced circumferentially around, and hingedly attached to, said hub and extendable inwardly and outwardly therefrom;

a plurality of masses each distributed along and extendable with a respective one of said elongated members;

drive motors attached to the central hub and one end of the elongated members for extending said elongated members and said distributed masses inwardly and outwardly from said hub; and motor generator means connected to said hub for rotation therewith, for generating electricity or providing a rotation force.

13. The system as described in claim 12 wherein said elongated members are extendable tangentially from said hub.

14. The system as described in claim 13, wherein said elongated members are longitudinally cylindrical sections conforming to the periphery of said hub when not extended.

15. A variable inertia energy storage system for mounting on land or on a vehicle, the storage system comprising:

a rotatable hub;

a plurality of elongated members equally spaced circumferentially around, and attached to, said hub and moveable inwardly and outwardly therefrom;

a plurality of solid masses each distributed along a respective one of said elongated members, and each being inwardly and outwardly movable with respect to said hub together with said respective elongated member;

means associated with said elongated members for controllably positioning each of said elongated members and said distributed masses with respect to the axis of rotation of said hub; and motor/generator means operatively connected to said hub for generating electricity or providing a rotation force.

16. The system as in claim 15 wherein said elongated members with distributed masses are iris elements.

17. The system as in claim 15 wherein said elongated members and distributed masses are hingedly connected to said hub and swing tangentially with respect to said hub.

* * * * *